United States Patent [19]

Harmon et al.

[11] 3,890,453
[45] June 17, 1975

[54] FORMING SHAPED POTATO PIECES FROM POTATO DOUGH

[75] Inventors: James F. Harmon; Richard D. Johnston; John H. Lach; William H. Von Der Lieth, all of Blackfoot; Thomas L. Murphy, Idaho Falls, all of Idaho

[73] Assignee: American Potato Company, San Francisco, Calif.

[22] Filed: Sept. 17, 1973

[21] Appl. No.: 398,042

Related U.S. Application Data

[62] Division of Ser. No. 170,164, Aug. 9, 1971, Pat. No. 3,771,937.

[52] U.S. Cl. ............... 426/503; 426/506; 426/516; 426/518
[51] Int. Cl. ............................................. A23l 1/12
[58] Field of Search ........... 426/506, 516, 512, 518, 426/503, 504

[56] References Cited
UNITED STATES PATENTS

| | | | |
|---|---|---|---|
| 1,762,159 | 6/1930 | Chase | 426/503 |
| 2,914,005 | 11/1959 | Gorozpe | 426/516 |
| 3,764,345 | 10/1973 | Beck et al. | 426/506 |
| R26,796 | 2/1970 | Lamb | 426/518 |

*Primary Examiner*—Norman Yudkoff
*Assistant Examiner*—M. G. Mullen
*Attorney, Agent, or Firm*—Townsend and Townsend

[57] ABSTRACT

Apparatus for combining a dry potato product with water so as to reconstitute the same into a firm potato dough. Apparatus for forming such dough into shaped potato pieces, such as french fry cut potato pieces. An impervious chamber for receiving the dry product and water, and a seal potato associated with the chamber for closing the chamber during reconstitution of the dough and for opening the chamber to permit ejection of the dough therefrom. An improved apparatus for forming the dough into shaped potato pieces as it is ejected from the chamber. A mechanism for metering a precise amount of the dry product into the chamber. A mechanism for metering a precise amount of water at a precisely controlled temperature into the chamber.

11 Claims, 6 Drawing Figures

FORMING SHAPED POTATO PIECES FROM POTATO DOUGH

This is a division of application Ser. No. 170,164, filed Aug. 9, 1971, now U.S. Pat. No. 3,771,937.

This invention relates to apparatus for effecting reconstitution of a dried potato product into potato dough and for forming such dough into shaped pieces, such as french fry cut potato pieces. The machine of the present invention arose out of ard is related to the subject matter of co-pending U.S. application, Ser. No. 816,675, filed Apr. 16, 1969 and now U.S. Pat. No. 3,605,647. The disclosure of the above-identified patent application is incorporated hereinto by this reference for its disclosure of certain control and timing circuits as more specifically referred to hereinbelow.

Apparatus of the type embodying the present invention, as well as that referred to in the co-pending patent application cited above, is arranged to introduce a preselected amount of dry potato product and water into a chamber in which such ingredients are retained for a time sufficient to permit formation of a homogeneous potato dough. The apparatus includes a piston in the chamber for ejecting the dough therefrom through one end of the chamber at which is provided a mechanism for separating the dough into shaped potato pieces. The shaped potato pieces are then readied for eating by heating them in a deep fat fryer or the like.

The chamber must be closed or sealed during the period of introduction of the dry potato product and water thereinto, during the period required for water to disperse throughout the dry potato product, and during the period required for formation of the dough. In the apparatus described in the above cited patent application, sealing of the chamber is effected by retaining at the outlet end of the chamber a quantity of dough from the preceding dough charge. Although such apparatus is most satisfactory in operation, it requires undue attention on commencement of operation after cleaning since a temporary sealing plug must be inserted during formation of the first dough charge. The sealing plug is then removed and stored during normal operation of the apparatus, and is accordingly subject to being misplaced or damaged.

An object of the present invention is to provide an improved sealing mechanism for the chamber in which the dry potato product and water are reconstituted into a dough. At one longitudinal end of the chamber an impervious seal plate is provided. The seal plate is moveable between a closed position and an open position. When the seal plate is in a closed position, dry potato product and water introduced into the chamber are confined within the chamber for a time sufficient to permit the product to set up into a relatively stiff dough. When the seal plate is moved to the open position, it clears the end of the chamber so that a piston in the chamber can be activated to eject the dough from the chamber. As the dough is ejected, it is formed into shaped potato bodies.

Another object of the present invention is to provide a mechanism for moving the seal plate between an open position and a closed position in synchronism with the remaining parts of the apparatus. This object is achieved in part by so mounting the seal plate that in moving between the open and closed positions, it traverses a path that is parallel to the path of movement of the piston within the chamber. Parallel movement of the piston and the seal plate permits synchronized movement between them by employment of relatively uncomplex and long wearing linkages.

Still another object of this present invention is to provide an interlock mechanism in association with the seal plate linkage that precludes ejection of dough from the end of the chamber until the seal plate has moved to a full open position. Achievement of this object is essential to afford clearance space for the transverse dough cutter and is made possible in a straightforward way because the movement of the seal plate is controlled by an operating rod that is supported for movement along a linear path parallel to the central axis of the chamber. The rod has a surface discontinuity thereon that cooperates with an electric switch which is operated only when the discontinuity reaches a position that corresponds to the open position of the seal plate. Operation of the switch is a prerequisite to activation of the dough ejection mechanism.

Yet another object of the present invention is to provide an improved transverse wire separator that acts on the dough as the dough is ejected from the end of the chamber to separate shaped pieces therefrom. This object is achieved by providing a single strand of wire and a support for the wire that is mounted for pivotal movement about an axis spaced vertically above the chamber opening. Because of the location of the axis of pivotal movement of the wire separator, the wire separator can be positioned clear of the opening so as to permit movement of the seal plate to a closed position without interference from the wire separator.

A feature and advantage of a wire separator according to the present invention is that it can be so mounted that the path of movement of the tranverse separating wire, although arcuate, is in a direction generally parallel to the longitudinal dimension of the french fry shape pieces. Accordingly, the wire, as it moves through the protruding dough, has virtually no tendency to distort the formed potato bodies.

Another feature and advantage of the transverse wire separator of this invention is that the axis about which it is pivoted can be positioned vertically above the center of fixed mutually parallel horizontal wires that span one end of the cylindrical chamber. As the transverse wire moves in a plane in close proximity to the plane of the fixed wires, it separates dough protruding from the chamber between the fixed wires thereby completing formation of the french-fry shaped potato bodies. Because the pivotal axis of the transverse wire is above the cylindrical chamber, the individual french-fry shaped bodies are separated sequentially from the bottom toward the top. Consequently each body is free to fall from the bottom as it is separated, thereby reducing the likelihood of breakage of the bodies.

A further object of the present invention is to provide a system for supplying a precise amount of water at a precise temperature to the chamber for effecting reconstitution of the dry potato product into potato dough. The present invention achieves such object by providing a water heating tank at a position below the level of the water inlet opening in the chamber and by providing a water pipe or conduit that extends from the tank to the chamber opening in a continuous path; the path slopes downward toward the water tank. Associated with the water tank is a pump that, when activated, pumps the water from the tank up through the sloping conduit until a preselected amount of water has been discharged whereupon the pump is deactivated.

On deactivation of the pump, the water remaining in the conduit returns to the heater tank by gravity so that the temperature of the water can be accurately controlled in preparation for another cycle of operation of the system. Thus, whether the machine is cycled at short intervals or long intervals, the temperature of the water introduced to the chamber is always at the optimum temperature to effect formation of the dry potato product into a dough.

Other objects, features, and advantages of the present invention will be more apparent after referring to the following specification and accompanying drawings in which.

Figure 1:
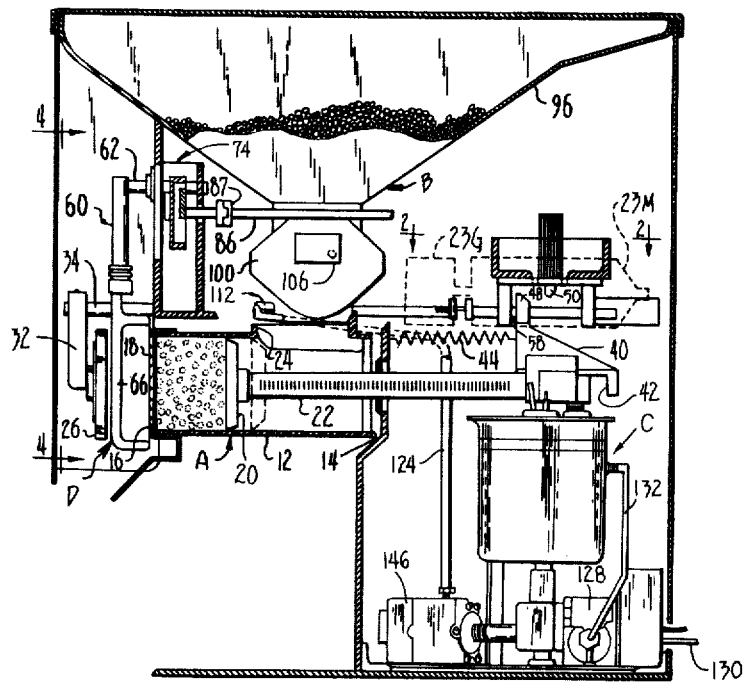
FIG. 1 is a side view of apparatus embodying the present invention with portions being broken away to reveal internal details.

Referring more particularly to the drawings and specifically to FIG. 1, reference character A indicates a chamber into which dry potato product is introduced from a dry product supply and metering system B for mixture with a metered amount of water from a water supply system C in order to form a mass of homogeneous potato dough in chamber A. At one axial end of chamber A is a dough-separating mechanism D which separates the dough into shaped potato pieces as the dough is ejected from chamber A.

Chamber A is formed by an impervious cylindric wall 12 which is so mounted that its central axis lies approximately horizontally. The chamber has a rear axial opening 14 and a forward axial opening 16. Dough-separating mechanism D is mounted adjacent opening 16 and includes a plurality of parallel wires 18. Dough-separating mechanism D, as more fully described in the patent application cited hereinabove, separates the dough into shaped pieces as it is ejected from chamber A. For so ejecting the dough, the apparatus is provided with a piston 20 carried on one end of a piston rod or plunger 22. Chamber A additionally includes an opening 24 in wall 12 which, as can be seen in FIG. 1, is located on the top of the cylindric wall and in the rear half thereof. Through opening 24, dry potato product from storage and metering mechanism B and water from water supply system C are introduced into chamber A.

Figure 2:
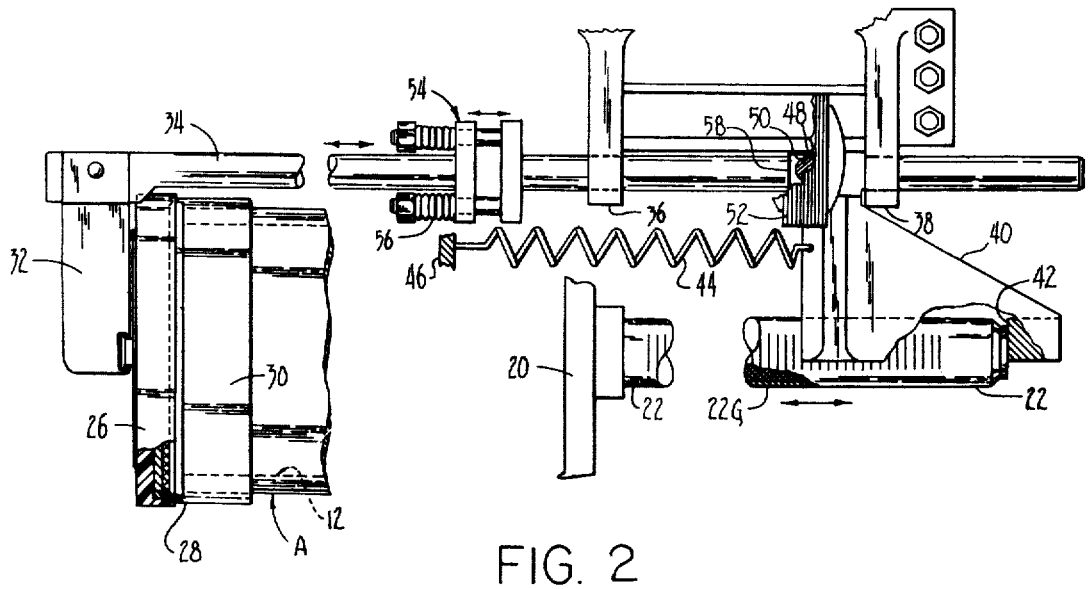
FIG. 2 is an enlarged fragmentary view of portions of FIG. 1.

For sealing the chamber during introduction of the constituents thereinto and during the time required for the constituents to set into a relatively firm dough, a seal plate 26 is provided. This seal plate 26 moves toward and way from open end 16 of chamber A. The inner face of the seal plate is preferably resilient so as to afford a watertight seal. A suitable arrangement, as seen in FIG. 2, is the provision of a resilient annular insert or ring 28 in the inner surface of the seal plate. A cylindrical frame 30 has an outer edge congruent to resilient annular ring, so that when the seal plate is in the closed position chamber A is sealed. Cylindric frame 30 is suitable retained in position on the end of the chamber and carries wires 18 in spanning relation of opening 16 of the chamber.

Figure 4:
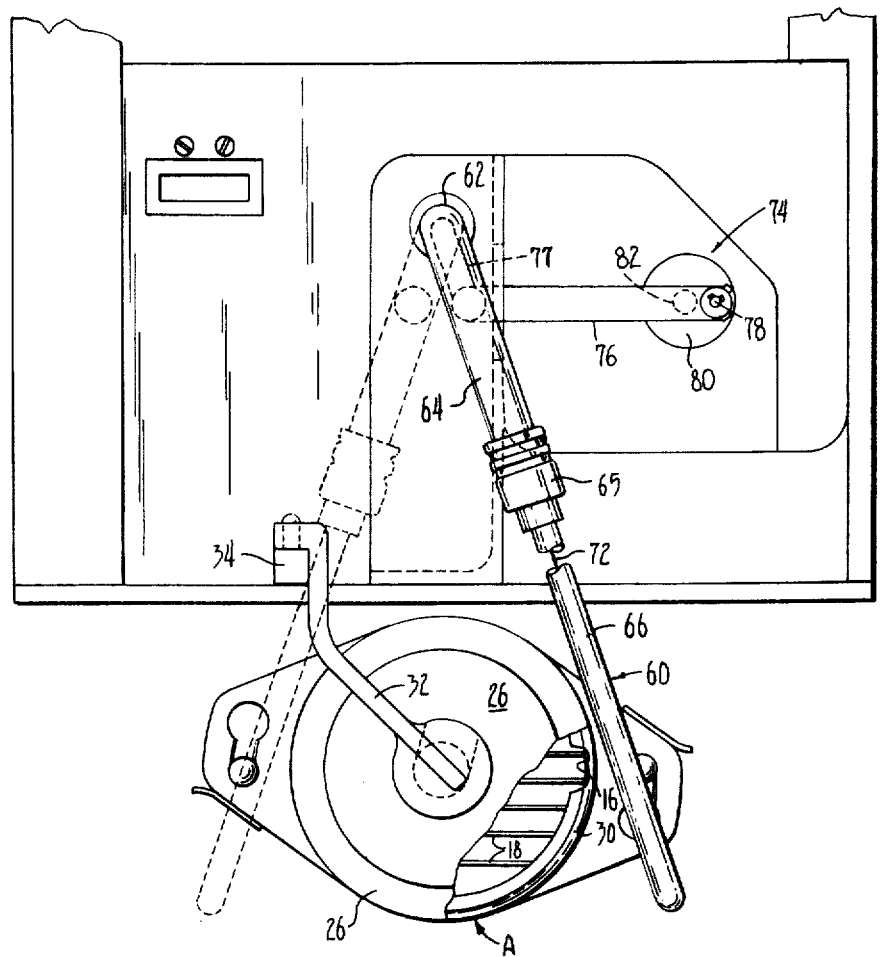
FIG. 4 is an enlarged end view taken along line 4-4 of FIG. 1.

Seal plate 26 is supported at its approximate center by an arm 32, which arm is carried on the outer end of a seal plate operating rod 34. As can be seen in FIG. 2, operating rod 34 is supported exterior of chamber A for movement along an axial path parallel to the central axis of chamber A by suitable guide bushings, two of which are indicated at 36 and 38. As shown in FIG. 4, operating rod 34 is supported laterally of the vertical center of the chamber so that it does not interfere with introduction of the dough constituents through opening 24 in the chamber. Rigid with the inner end of seal plate operating rod 34 is a laterally extending link 40 that defines an abutment surface 42 in alignment with the central axis of chamber A and with the rear extremity of piston plunger 22. Thus, as the plunger is driven rearward (toward the right as viewed in FIG. 2) operating rod 34 is correspondingly driven, whereby seal plate 26 is moved toward the closed position. The mechanism for so driving piston plunger 22 is disclosed in the above cited patent application and includes a pinion gear (not shown) that engages a gear rack 22G formed along plunger 22. Such pinion gear is driven by a motor 23M through a gear box 23G, the details of which are set forth in the above cited patent application.

As piston plunger 22 is driven toward the right, as viewed in FIG. 2, it moves link 40 and seal plate operating rod 34 against the force of a spring 44 which has one end fastened to link 40 and the other end fastened to a fixed member 46 which is a part of the frame of the apparatus. FIG. 2 depicts the apparatus in a condition in which spring 44 is at its most extended or stressed condition and in which seal plate 26 closes chamber A. For retaining the seal plate in the closed position, there is mounted on operating rod 34 a dog 48 that moves with the operating rod. A latching pawl 50 is supported in the path of movement of dog 48 so that when the operating rod reaches the position wherein seal plate 26 is closed, the pawl engages the dog and thereby retains the seal plate in the closed position. The pawl is linked to an electromagnetic solenoid 52; when the solenoid is energized pawl 50 is retracted from engagement with dog 48 and the energy stored in spring 44 moves operating rod 34 and seal plate 26 to the open position, leftward as viewed in FIG. 2.

In order to bias seal plate 26 into sealing relation to chamber A when dog 48 is engaged by pawl 50, rod 34 is provided with a yieldable coupling 54 which includes compression springs 56. The force stored in the compression springs urges sealing plate 26 into watertight relationship with chamber A, see FIG. 2.

Seal plate operating rod 34 includes a shock absorbing resilient ring 58 which cushions to contact between link 40 and bushing 36 when the seal plate is moved to the open position by the energy stored in spring 44. The open position of the seal plate is depicted in FIG. 1 and from such figure it will be seen that there is a substantial clearance space between the inner surface of the seal plate and end 16 of chamber A. Such clearance space is sufficient to enable a tranverse dough cutter 60 to swing back and forth so as to separate into french fry shaped bodies the dough portions protruding beyond wires 18. The transverse dough cutter is mounted on a pivot shaft 62 that is journaled in the frame of the apparatus for movement about an axis that is generally vertically aligned above the central axis of chamber A. As can be seen most clearly in FIG. 4, pivot shaft 62 is exterior of cylindrical wall 12 of chamber A by a distance that is sufficient to permit the cutter to traverse the entire body of dough protruding from chamber A. Optimum cutting of the protruding dough is achieved if the distance between the pivotal axis of the cutter and chamber A equals approximately one and one-half the diameter of chamber A.

Figure 5:
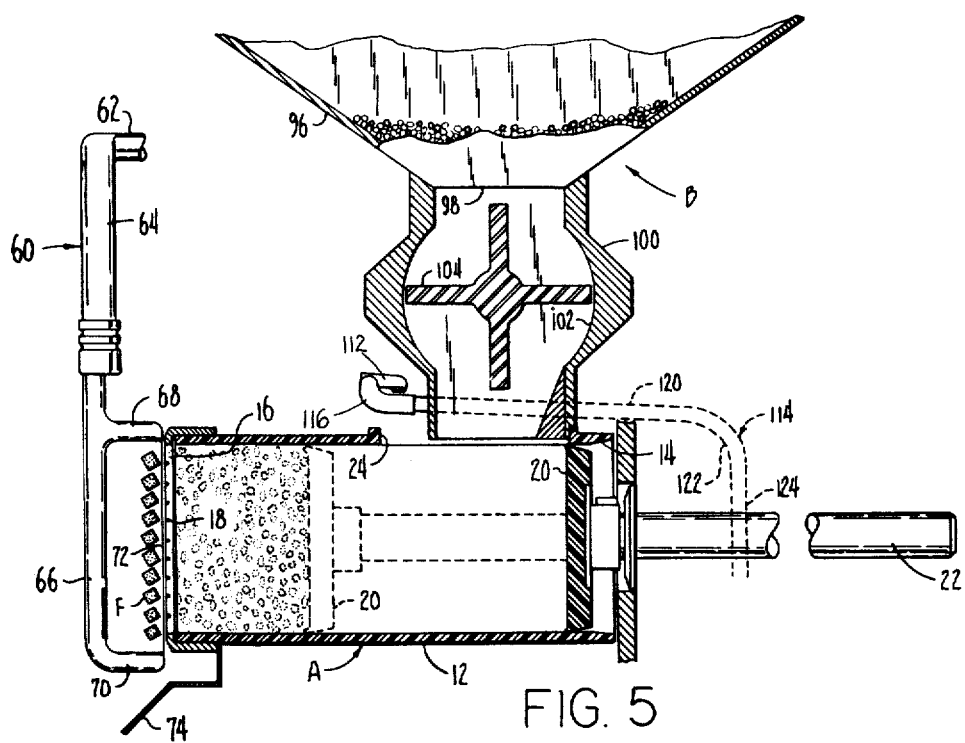
FIG. 5 is an enlarged fragmentary view of a portion of FIG. 1.

Transverse cutter 60 includes an arm 64 that is mounted rigidly to shaft 62. To the free end of arm 64 a releasable connector 65 mounts a cutter frame 66 to the arm. From arm 66 fingers 68 and 70 extend inwardly toward wires 18. Spanning the inner end of fingers 68 and 70 is a single taut wire 72 that separates the portion of the dough that protrudes from chamber A through the spaces between wires 18. As can be seen in FIG. 5, french fry bodies F are separated from the dough mass protruding from chamber A and fall by gravity against a deflector plate 74 into a suitable container (not shown).

The two extreme positions of the tranverse cutter are shown in FIG. 4, one in solid lines and one in broken lines. It will be appreciated that in moving between the two extremes cutter wire 72 moves in a direction that, although it is arcuate, is generally parallel to the spaces between wires 18 and therefore axial of the french fry bodies F. This direction of movement is a direction with respect to the french fry bodies F that minimizes the tendency to break or distort the dough during formation of the french fry bodies. It will also be seen from FIG. 4 that when transverse cutter 60 stops in the extreme rightward position, the cutter is clear of opening 16 in chamber A so that seal plate 26 can be moved to the closed positon without interference from the transverse cutter.

The transverse cutter is reciprocated between the two extreme positions shown in FIG. 4 by a cutter drive mechanism generally indicated at 74. Such mechanism includes a tie-rod 76 that extends from a crank 77 that is rigid with shaft 62 and arm 64 of the transverse cutter. The opposite end of a tie-rod 76 is pinned at 78 to a disk 80. The center of disk 80 is supported on a shaft 82 which is rotatively driven by motor 23M through a suitable power train including gear box 23G. Because pin 78 is eccentric of shaft 82, rotation of the shaft effects lateral reciprocation of transverse cutter 60 between the extremes shown in FIG. 4. As can be appreciated from FIGS. 1 and 4, drive shaft 82 is laterally spaced from the center of the apparatus so as to avoid interferring with introduction of dry product and water into chamber A through opening 24.

Figure 3:
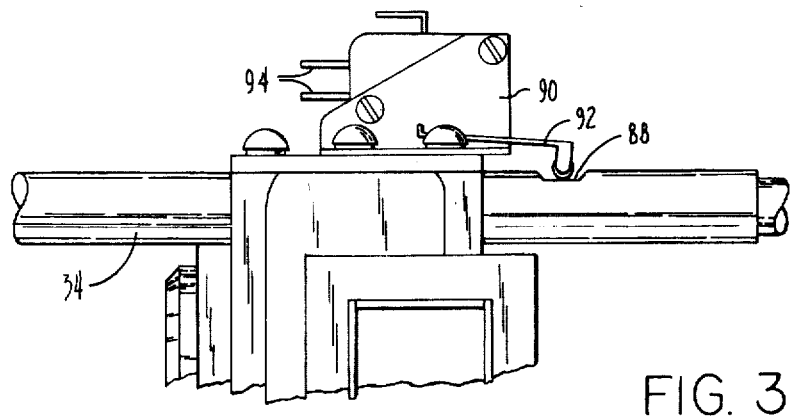
FIG. 3 is an enlarged fragmentary view of a detail of FIG. 1.

Shaft 82 includes a solenoid operated clutch 87 so that operation of transverse cutter frame 66 can be obtained only by application of an electric signal to the clutch. The operation of the transverse cutter as well as the operation of motor 23M is inhibited until a seal plate 26 is moved to the full open position. To accomplish this, seal plate operating rod 34 has a surface discontinuity 88 thereon, see FIG. 3. Mounted adjacent to the path of movement of the operating rod is a limit switch 90 which has an actuating arm 92 which bears on the surface of operating rod 34. When discontinuity 88 reaches a position opposite actuator 92, a position corresponding to the full open position of seal plate 26, a circuit is established between terminals 94 of the limit switch. Such terminals are in circuit with the control circuitry of the type more fully described in U.S. patent application, Ser. No. 816,675, which circuitry controls the operation of piston plunger 22 and transverse cutter drive mechanism 74.

Dry product storage and metering system B includes a storage hopper 96 which terminates in a discharge opening 98. In communication with opening 98 below the hopper is a metering housing 100 which is gravity fed with dry product from hopper 96. Housing 100 includes a cylindric chamber 102 in which a vaned rotor 104 is mounted. In the embodiment shown in the drawings, vaned rotor has four equally spaced vanes between each adjacent pair of which is formed a uniform volume. Thus the quantity of dry product that is deposited into chamber A from the dry product storage and metering apparatus is proportional to the number of revolutions through which rotor 104 is driven.

Rotor 104 is powered through a motor 106. The showing of motor 106 in FIG. 1 is merely schematic since this element is conventional and does not per se constitute a part of the present invention.

As the dry product is introduced into chamber A from dry product storage and metering apparatus B, water is introduced into the chamber from water supply system C through a water nozzle 112. A continuous pipe or conduit 114 extends from the water supply system to the nozzle which conduit, as seen most clearly in FIG. 5, slopes continuously downward from a point adjacent nozzle 112 to the water supply system. More particularly, conduit 114 includes a curved segment 116 immediately adjacent above nozzle 112. Curved segment 116 is joined to a rearwardly extending and downwardly sloping segment 120 at the rear extremity of which is a bend 122 and a vertical segment 124 which extends to the water supply system C. Thus, water cannot remain within conduit 114 but will instead drain from nozzle 112 by gravity back to the water supply system C.

Figure 6:
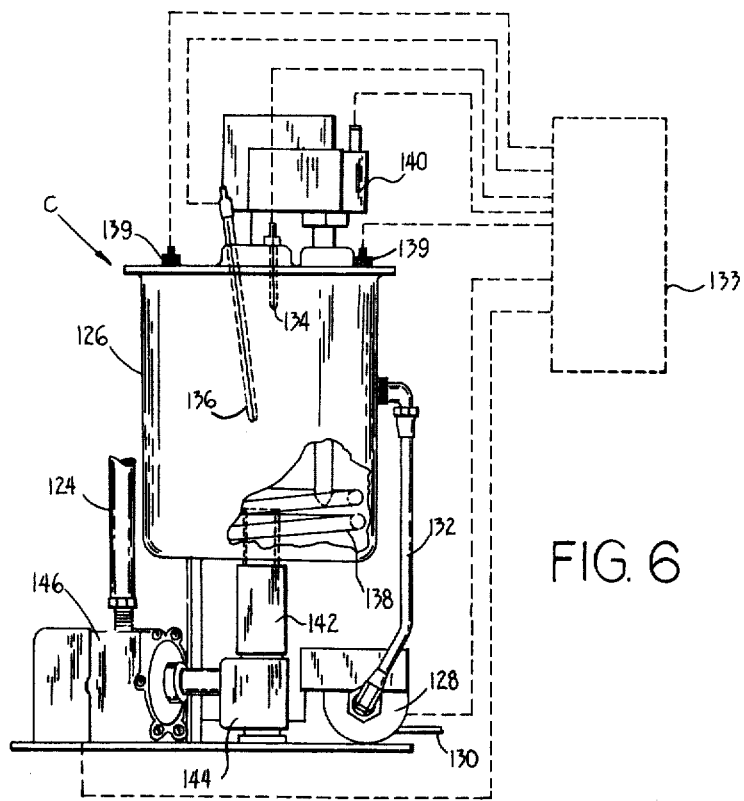
FIG. 6 is an enlarged fragmentary view of a portion of FIG. 1.

Referring now to FIG. 6, water supply system C includes a tank 126 which functions to receive tap water, heat the water to an elevated temperature that is suitable to effect reconstitution of the potato product into a homogeneous dough, and dispense a metered amount of the heated water into a chamber A. Associated with tank 126 is an inlet solenoid valve 128 having a water inlet line 130 connected to a conventional water line and an outlet 132 connected to tank 126 at a location above the lower region thereof. Solenoid valve 128 is controlled through a control circuit 133 which opens and closes the valve in accordance with conditions to be described.

One condition is the level of the water in tank 126. When the level in tank 126 rises to a height corresponding with the lower end of an upper electrode 134, control circuit 133 closes solenoid valve 128. When the level of water in tank 126 corresponds with the lower end of a lower electrode 136, outflow of water from the tank is termined. Solenoid valve 128 then opens to replenish the supply of water within tank 126. Accordingly, electrodes 134 and 136 control through circuit 133 the operation of solenoid valve 128 which in turn controls the level of water within tank 126.

Also included in tank 126 is a heater coil 138 which is supplied with power through terminals 139 and which heats the water within tank 126 until a predetermined temperature is achieved within the tank. Such predetermined temperature is sensed by a thermostat 140 which deenergizes heating coil 138 when the desired temperature is achieved; control circuit 133 cooperates with and is responsive to thermostat 140 for so deenergizing the heating coils by interrupting power to terminals 139.

Tank 126 is provided with an outlet 142 which communicates through a suitable fitting 144 with a pump 146. The outlet of pump 146 communicates with nozzle 112 through upwardly sloping conduit 114. Pump 146 is a pump of the type that when deactivated permits backflow therethrough so that the water residing in conduit 114 can flow by gravity back into tank 126 whereby no significant volume of water resides in conduit 114 during the periods when pump 146 is not operating. It has been found that a centrifugal pump achieves the above-stated criterion for pump 146. Stated otherwise, when pump 146 is operating, it withdraws water from tank 126 and forces it through conduit 114, whereas when the pump is deactivated the water residing within conduit 114 is permitted to flow back through pump 146 into tank 126.

It is sufficient for the present disclosure to describe the function and operation of control circuit 133 since the specifics of the same are described in the aforecited patent application. As the water level in tank 126 rises in response to inflow of water through solenoid valve 128, the water reaches the level of the lower end of electrode 134 whereupon, through control circuit 133, valve 128 is deactivated so as to terminate the inflow of water. When the water in tank 126 reaches a preselected temperature, thermostat 140 senses such and readies circuit 133 for operation of the water supply system on command of the operator. When the water supply system is activated in response to timing circuitry that indicates readiness for water to be introduced into chamber A, pump 146 is activated so as to pump water from tank 126 through the pump and through conduit 114 and through nozzle 112 into chamber A. Operation of pump 146 continues until the water level falls to a level corresponding to the lower end of electrode 136, whereupon pump 146 is stopped and water delivery into chamber A is similarly stopped. Because pump 146 when stopped permits water flow therethrough, the water in conduit 114 flows back into tank 126 rather than remaining in conduit 114. Accordingly, the presence of ambient temperature in the atmosphere surrounding conduit 114 has no substantial effect on the temperature of water ultimately introduced into chamber A to effect reconstitution of the dough. Circuit 133 is arranged to energize solenoid valve 128 whereupon water is introduced into tank 126 until it reaches a level corresponding to the lower end of electrode 134, whereupon the above described sequence of events recurs.

The operation of the invention is as follows: With piston 20 in the positon shown in FIG. 2, corresponding to a position indicated by broken lines in FIG. 1, the dough in chamber A between the face of the piston and the face of the seal plate will be assumed to have formed into a homogeneous relatively stiff dough suitable for formation of french fry shaped potato bodies. Because seal plate 26 is in the position shown in FIG. 2, such formation of the dough can proceed without leakage through the forward end of the chamber. Moreover, maintenance of the seal plate in a closed position until it is desired to dispense french fry shaped pieces avoids possible contamination or drying of the dough. Suitable timing circuits of the type described in U.S. patent application Ser. No. 816,675 prohibit movement of piston 20 beyond the described position until the dough has so set up. When it is desired to dispense french fry shaped pieces from chamber A, the operator of the apparatus presses a start button (not shown) which energizes solenoid 52 thereby withdrawing pawl 50 from engagement with dog 48. In consequence of such, seal plate 26 moves to the open position (shown in FIG. 1) because of the energy stored in spring 44. Contact of shock absorber 58 with bushing 36 terminates the forward or outward movement of the seal plate at which position (see FIG. 3) discontinuity 88 on seal plate operating rod 34 moves into a position shown in the figure so that actuator 92 effects completion of a circuit between terminals 94 of limit switch 90. In a manner more fully described in the above cited patent application, this initiates forward incremental movement of piston 20 with which is synchronized the movement of transverse cutter 60 so that the dough within chamber A moves forward by an amount equivalent to the thickness of a french fry body and then stops momemtarily while transverse cutter 60 swings across the dough that protrudes between wires 18 thereby severing a plurality of french fry bodies indicated at F in FIG. 5. When transverse cutter 60 reaches the broken line position of FIG. 4, the gear box is adapted to move piston 20 forward another increment after which the dough stops and transverse cutter 60 returns to the solid line position of FIG. 4 thereby severing another series of french fry bodies. Such action is continued until piston 20 moves substantially against wires 18 to expel virtually all of the dough within the chamber, after which plunger 22 and piston 20 are withdrawn to the rear of chamber A, i.e. toward the right as viewed in the figures. Continued rearward movement of plunger 22 brings the inner or right-hand end of the plunger into contact with abutment 42 on link 40 which moves operating rod 34 and seal plate 26 rightwardly until the seal plate is closed and engagement between dog 48 and pawl 50 is effected. As disclosed in the above cited patent application, control circuitry 133 then effects introduction of the dry material and water through opening 24 into chamber A. More particularly, rotor 104 is revolved by means of motor 106 through an appropriate number of quarter rotations to meter the desired amount of dry product into chamber A and pump 146 is energized to force heated water residing in tank 126 up through conduit 114 for discharge through nozzle 112. Operation of the apparatus, including activation of rotor 104 and pump 146, is interlocked through control circuit 133 so that the introduction of dry product and water into chamber A cannot take place unless the water within tank 126 is at the proper temperature. During introduction of the constituents into chamber A, piston 20 is moved leftwardly to the first described position, corresponding to the broken line position of FIG. 1, so as to consolidate the water and dry product whereby a homogeneous dough can be formed in the chamber. Because seal plate 26 is firmly retained in the closed position by means of engagement of dog 48 by pawl 50 and the resilient force provided by mechanism 54, water cannot leak out of the front opening of the chamber. As stated above, the water that resides in conduit 114 at the time of termination of operation of pump 146 drains back into heater tank 126 and does not remain in the conduit. Accordingly, precise control of water temperature is achieved at all times.

As the dough is setting up as described next above, the water level in tank 126 is raised in the manner described hereinabove until the water reaches a level corresponding to the lower end of electrode 134 whereupon solenoid valve 128 is deenergized. As stated before, operation of the apparatus is inhibited until such time as the water within tank 126 reaches the desired temperature.

When the water level in tank 126 reaches electrode 134 and when the water reaches a temperature sufficient to effect reconstitution of the constituents within chamber A into a homogeneous dough (e.g., 140°F.), the apparatus is then ready for another dispensing operation at the option of the operator. Thereafter, the sequence of operations proceeds as described hereinabove.

Thus it will be seen that the present invention provides apparatus for forming shaped potato pieces that requires no residual dough charge within the chamber because of the effectiveness of the seal plate 26 in rendering impervious the front end of the chamber during reconstitution of the dry product and water into a stiff dough. Because the seal plate is carried on operating rod 34 and because operating rod 34 moves in a path parallel to piston 20 and plunger 22, the linkages between the two elements is straightforward, simple and virtually maintenance-free. Moreover by the design of the improved transverse cutter 60, the seal plate can be moved in and out without interference from the transverse cutter, and the transverse cuter can be operated without interference from the seal plate. Finally, because of the construction of the water supply system, and particularly the downwardly sloping relationship of conduit 114 in combination with the operation of pump 138, water introduced into chamber A will at all times be of the desired volume and temperature. Accordingly, an optimum dough consistency is achieved for each cycle of operation of the apparatus, notwithstanding possible changes in ambient temperature in which the apparatus operates.

Although one embodiment of the present invention has been shown and described, it will be obvious that other adaptations and modifications can be made without departing from the true spirit and scope of the invention.

What is claimed is:

1. A process of reconstituting without agitation a mass of dehydrated potato product and water into a homogeneous potato dough suitable for shaping into French-fry potato pieces comprising the steps of:
   a. providing a variable volume chamber for constraining the contents of the chamber an outlet opening and an inlet opening and a reciprocable piston within the chamber for consolidating the contents thereof:
   b. sealing the outlet opening of the chamber with an externally mounted liquid impervious member;
   c. metering a predetermined quantity of dehydrated potato product and water into the chamber in front of the piston through the inlet opening;
   d. consolidating the contents by moving the piston within the chamber toward the outlet end of the chamber thereby reducing the volume of the chamber to a predetermined volume bounded by the impervious member, the chamber and the piston so that the water substantially fills the available voids in and between the individual dry product particles without agitation to form a homogeneous dough suitable for forming into French-fry-cut potato pieces.

2. The process of claim 1 further comprising the step of latching the impervious member in the sealing position.

3. The process of claim 1 wherein the step of metering of the dry product and water into the chamber is performed simultaneously with the step of moving the piston to the consolidation position.

4. The process of claim 1 wherein the metering of water step includes the step of pumping the water from a tank to the inlet opening through a conduit and further comprising the step of draining back to the tank the unused water in the conduit and heating the same to a predetermined temperature in readiness for subsequent metering steps to attain precise control of the water temperature at all times.

5. The process of dispensing French-fry-cut potato pieces from homogeneous dough which has been reconstituted from a mass of dehydrated potato product and water as set forth in claim 1 further comprising the steps of:
   a. moving the impervious member to an open position spaced from the outlet opening of the chamber;
   b. advancing the dough through the outlet opening to divide the dough into French-fry-cut potato widths,
   c. separating the protruding portions in synchronism with the advancing step so that the portions are separated into French-fry-cut potato bodies.

6. The process of claim 5 wherein the step of advancing to divide the dough into French-fry potato widths includes advancing the dough through the spaces between a set of parallel spaced apart wires fixedly spanning the outlet opening which subject the dough to only a slight pressure as it is advanced through the spaces between the wires.

7. The process of claim 6 wherein the separating step includes swinging a pivotally mounted transverse wire cutter in an arcuate path across all the spaces between the set of parallel wires spanning the outlet opening.

8. The process of claim 5 further comprising the step of continuing the advancing and separating steps until the chamber is substantially emptied of dough.

9. The process of claim 5 further comprising the step of inhibiting further operation of the apparatus following initiation of the moving step until the impervious member has reached the full open position to assure adequate clearance from the outlet end to accomplish the advancing and separating steps without interference from the impervious member.

10. The process of claim 5 wherein the moving step is preceded by the steps of:
    a. initiating the dispensing operation by manual operation of a switch; and
    b. unlatching the impervious member from a sealing position over the outlet opening.

11. The process of claim 5 wherein the advancing step is intermittent and separating is accomplished during quiescent dough moving periods.

* * * * *